July 16, 1963 C. A. CHAYNE 3,097,542
BRAKE PEDAL ASSEMBLY
Filed April 10, 1961

INVENTOR.
Charles A. Chayne
BY
W. F. Wagner
ATTORNEY

United States Patent Office 3,097,542
Patented July 16, 1963

3,097,542
BRAKE PEDAL ASSEMBLY
Charles A. Chayne, Bloomfield Hills, Mich., assignor to General Motors Corporation, Detroit, Mich., a corporation of Delaware
Filed Apr. 10, 1961, Ser. No. 101,818
1 Claim. (Cl. 74—560)

This invention relates to vehicle operating controls and more particularly to brake pedal constructions for automotive vehicles.

In recent years, traffic density and high speed operation of vehicles has greatly increased the need for minimizing the time required in application of the brakes. In emergency situations, delays of even small fractions of a second in elapsed time may make the difference between a successful stop and a disastrous accident. Various expedients have been employed to decrease the distance through which the operator's foot travels during such operation so that the elapsed time is only slightly greater than the reaction time of the operator. However, even in the most modern vehicles, the level of the brake pedal is somewhat higher than the position which the operator's foot occupies when resting on the accelerator pedal. As a result, the purely physical movement of transferring the foot from the accelerator pedal to the brake pedal occasionally results in momentary delay caused by the sole of the shoe engaging the edge of the brake pedal nearest the accelerator pedal. Under such circumstances, the total elapsed time for brake application may be extended sufficiently to make the difference between successful and unsuccessful deceleration of the vehicle.

An object of the present invention is to provide an improved brake pedal construction.

Another object is to provide a brake pedal assembly which is constructed and arranged so as to reduce or eliminate any increase in elapsed time required to apply the brake caused by inadvertent engagement of the edge of the brake pedal by the operator's foot when the latter is lifted from the accelerator pedal.

Still another object is to provide a brake pedal assembly wherein the pedal portion is hinged on an axis parallel with the plane of movement of the assembly so that the pedal portion is free to swing upwardly and outwardly if engaged by the operator's foot from the underside.

A further object is to provide an arrangement of the stated character wherein the pedal is yieldably biased in a direction opposing upward movement of the operator's foot, and the pedal and brake lever are formed with abutting portions which arrest movement of the pedal in such direction when the pedal reaches a position perpendicular to the plane of movement of the pedal assembly.

These and other objects, advantages, and features of the invention will become more fully apparent as reference is had to the accompanying specification and drawing wherein.

Figure 1:
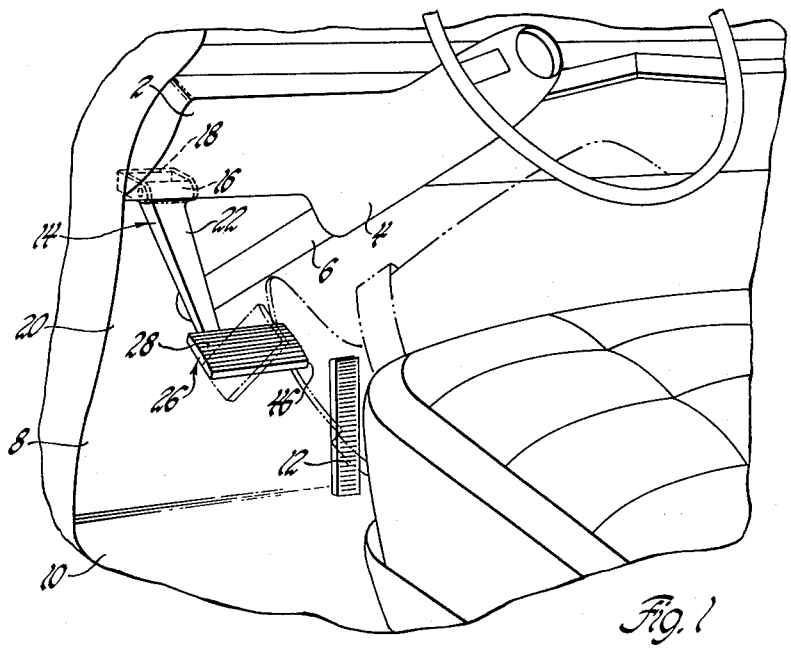
FIG. 1 is a fragmentary perspective view of the interior of a vehicle equipped with a brake pedal assembly in accordance with the present invention.

Referring now to the drawings and particularly FIG. 1, there is shown a portion of a motor vehicle in which the reference character 2 designates the instrument panel portion which includes a steering mast jacket 4. Extending through jacket 4 is the usual steering column 6, the lower end of which projects downwardly through the inclined portion 8 of the body floor pan 10. Mounted slightly to the right of steering column 6 in a conventional manner on inclined portion 8 is an angularly displaceable accelerator pedal 12. Mounted on the left side of steering column 6 is a pendant type brake pedal assembly 14. The upper end of assembly 14 is formed with a transverse hub portion 16 pivotally connected on a transverse horizontal axis to a bracket 18 secured to the engine fire wall 20. Integral with hub 16 is a downwardly and rearwardly extending lever portion 22, the lower extremity 24 of which underlies a transversely extending pedal member 26. Pedal member 26 comprises a transversely ribbed generally rectangular rubber body 28, the lower surface of which is formed for snap-on engagement with a metal supporting plate 30. As seen best in FIG. 1, the plan form of pedal member 24 is laterally offset substantially with respect to the vertical longitudinal plane of lever 22, with the major portion thereof extending in the direction of accelerator pedal 12. While this arrangement substantially reduces the lateral distance through which the vehicle operator's foot is required to travel when removed from accelerator pedal 12, as with all brake pedal and accelerator pedal arrangements the lateral overhang combined with the upward displacement of the brake pedal presents the inherent danger of arresting upward movement of the operator's foot if lateral movement thereof is not properly coordinated with upward movement, a situation not uncommon under panic stop conditions.

Figure 2:
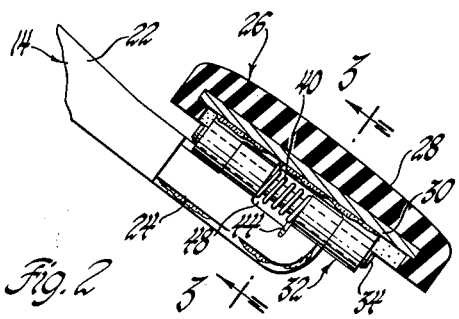
FIG. 2 is an enlarged fragmentary side elevational view, partly in section, of the lower portion of the pedal assembly shown in FIG. 1.
Figure 3:
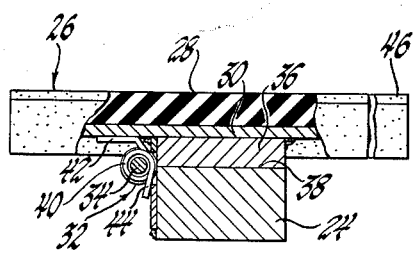
FIG. 3 is a sectional view looking in the direction of arrows 3—3 of FIG. 2 showing the pedal member in the normal operating position.
Figure 4:
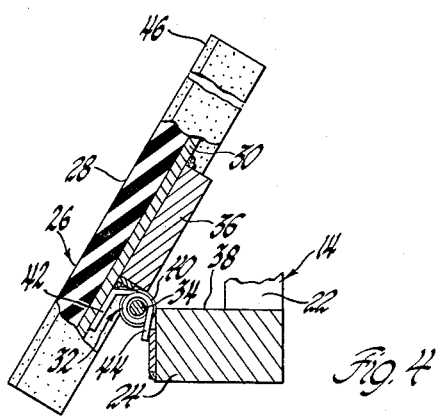
FIG. 4 is a view similar to FIG. 3 showing the pedal member in an angularly displaced position induced by engagement with the operator's foot.

In order to overcome this inherent danger in accordance with the general features of the invention, pedal member 26 is hinged so as to swing upwardly and outwardly upon upward engagement by the operator's foot and subsequently return to normal operating position as soon as disengagement occurs. As seen in FIGS. 2 and 3, the lower surface of supporting plate 30 and the left hand side of lever 22 are connected together by a hinge assembly 32, the hinge pin 34 of which extends in a direction parallel with the swinging plane of movement of the pedal assembly. As seen best in FIGS. 3 and 4, hinge assembly 32 is located so that when pedal member 22 lies in a horizontal position, abutting contact is established between an abutment plate 36 secured on the lower surface of supporting plate 30 and the upper surface 38 of lever 22. In the embodiment shown, pedal member 26 is resiliently urged angularly clockwise, as viewed in FIG. 3, into the position shown in FIG. 3 by a coil type torsion spring 40 which surrounds the central portion of the hinge pin 34 and has its opposite free ends 42 and 44 engaging plate 30 and lever 22. Pedal 26 thus is normally maintained in a position similar to a conventional fixed brake pedal and normally operates in an identical manner. However, in the event that the operator inadvertently shifts his foot too far to the left before it has been elevated sufficiently to clear the right hand edge 46 of pedal 26, subsequent upward movement of the operator's foot merely causes the pedal 26 to yieldably swing upwardly about the axis of hinge 34 rather than causing the shoe to "hang up" and momentarily delay the application of the brakes. It will be noted that even with a relatively long pedal, the radius of movement of edge 46 causes the edge to move laterally toward the left after a slight upward deflection of the pedal and thus will quickly disengage the operator's foot and return to the normal horizontal position allowing application of the brakes by downward movement of the operator's foot.

From the foregoing it will be seen that a novel and improved brake pedal construction has been devised. The invention is not only simple and inexpensive, but affords a safety factor, the value of which is far in excess of the modest cost involved.

While but one embodiment of the invention has been shown and described, it will be apparent that other changes and modifications may be made therein. It is, therefore, to be understood that it is not intended to limit the invention to the embodiment shown, but only by the scope of the claim which follows.

I claim:

In a motor vehicle having a manually operated accelerator pedal, a manually operated brake pedal assembly disposed in laterally adjacent relation to said accelerator pedal, said brake pedal assembly including a lever arm and a transversely extending pedal member which is hinged to said lever arm in a manner permitting the portion of said pedal member adjacent said accelerator pedal to swing laterally away from said accelerator pedal only when said portion of said pedal member is engaged manually in a direction opposite to that required to actuate said lever arm for brake operation.

References Cited in the file of this patent

UNITED STATES PATENTS

| | | |
|---|---|---|
| 446,885 | Pope | Feb. 24, 1891 |
| 1,236,489 | Sears | Aug. 14, 1917 |
| 1,470,211 | Baxter | Oct. 9, 1923 |
| 1,505,949 | Down | Aug. 26, 1924 |
| 1,606,144 | Cavanagh | Nov. 9, 1926 |
| 1,657,738 | Booth | Jan. 31, 1928 |
| 2,034,279 | Beede | Mar. 17, 1936 |
| 2,423,006 | Chambers et al. | June 24, 1947 |
| 2,842,239 | Banker | July 8, 1958 |
| 2,919,773 | Fong | Jan. 5, 1960 |

FOREIGN PATENTS

| | | |
|---|---|---|
| 115,447 | Austria | Dec. 27, 1929 |
| 681,711 | France | Feb. 4, 1930 |
| 1,032,932 | France | Apr. 1, 1953 |
| 1,068,797 | France | Feb. 10, 1954 |